March 24, 1931. B. E. SHLESINGER 1,797,372
MACHINE FOR PRODUCING GEARS
Filed Dec. 30, 1927 3 Sheets-Sheet 1

INVENTOR
B. E. Shlesinger

March 24, 1931.  B. E. SHLESINGER  1,797,372
MACHINE FOR PRODUCING GEARS
Filed Dec. 30, 1927   3 Sheets-Sheet 3
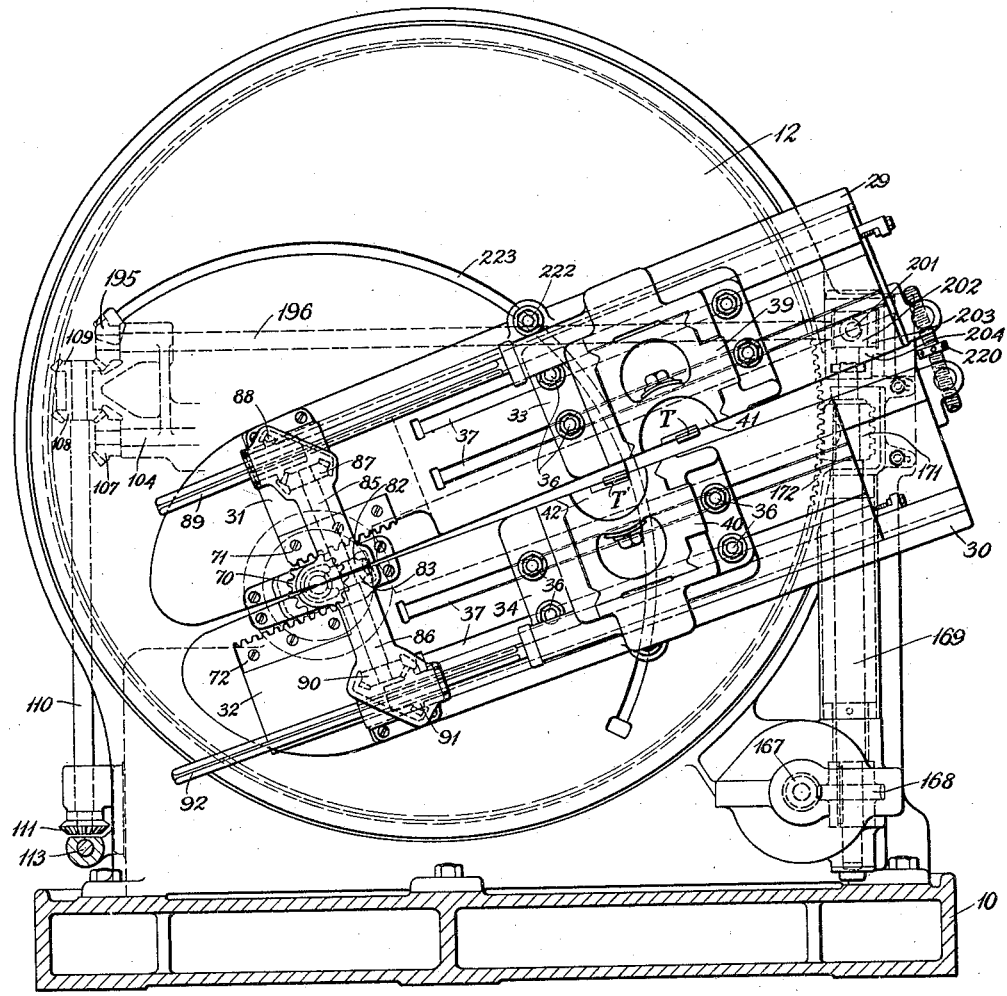
Fig. 3
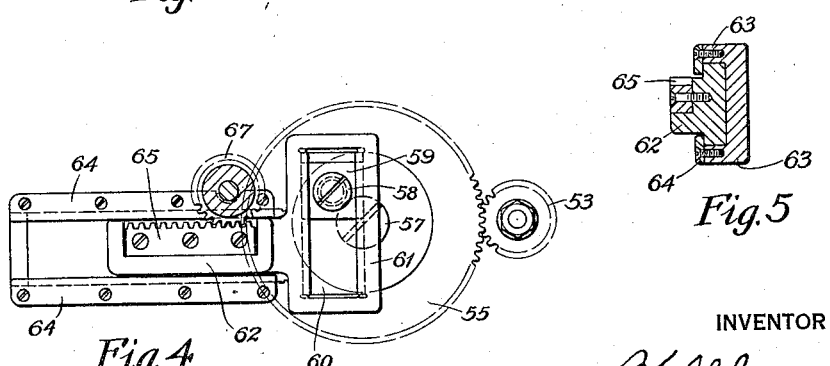
Fig. 4
Fig. 5
INVENTOR Patented Mar. 24, 1931

1,797,372

UNITED STATES PATENT OFFICE

BERNARD EDWARD SHLESINGER, OF IRONDEQUOIT, NEW YORK, ASSIGNOR TO GLEASON WORKS, OF ROCHESTER, NEW YORK, A CORPORATION OF NEW YORK

MACHINE FOR PRODUCING GEARS

Application filed December 30, 1927. Serial No. 243,607.

The present invention relates to machines of the continuous indexing type employing a reciprocating tool or tools for cutting the teeth.

In gear cutting machines employing planing tools, a very common form of drive for reciprocating the tool slide or slides is one employing a crank and connecting rod as the tool slide actuating means. With such a drive, the high speed necessary for cutting can be attained and at the same time the shocks, which would otherwise occur were the slides reversed while traveling at high speed, are obviated. The crank slows down the slides at either end of their stroke and starts them in the opposite direction at gradually increasing speed after reversal. Moreover, the length of the tool stroke can be changed at will by changing the radial position of the crank-pin.

In gear planing machines employing two tools, it is always desirable to have the two tool slides moving simultaneously in opposite directions, so that the motion of one is counteracted or counter-balanced by the motion of the other and any tendency of the reciprocating motion of the slides to create vibration in the machine is minimized. It is also desirable to have the tools cut alternately, for the impact of two rapidly moving tools simultaneously upon a blank is very apt to cause a vibration or chatter which will result in a poor tooth surface finish.

The motion of a slide or other member to which a connecting rod is attached is not the same for one-half of the revolution of the crank plate as for the other half, because during one-half of the revolution of the crank plate, the crank pin is moving toward the slide and during the other half away from the slide or other member to which the connecting rod is secured. In a two tool machine operating according to the intermittent indexing principle in which one crank is used to actuate both tool slides, this difference in velocity for the two halves of the crank rotation is of no material consequence because the longitudinal tooth shape produced in such a machine depends on the direction of the tool motion not on the velocity with which the tools move.

In a planing machine operating according to the continuous indexing process, however, the tooth curve produced is a direct result of the combined motion of tool and blank and a change in the velocity of the tool will cause a change in the tooth curve. Were a single crank and connecting rods employed in this latter type of machine, then, to reciprocate two tool slides alternately in opposite directions, one form of tooth curve would be produced on one side of the teeth by one tool and a different form of tooth curve would be cut on the other side of the teeth by the other tool.

It would be possible, of course, to employ in a machine operating according to the continuous indexing process two separate cranks, one for reciprocating each tool slide, but this would only cause additional complications and increased costs.

Two tool planing machines have been built operating according to the continuous indexing principle in which both tools are mounted on a single slide reciprocated by a single crank and connecting rod. In this case, however, both tools engage the blank simultaneously and the simultaneous impact of the two tools upon a rotating blank is certainly a very possible source of vibration and chatter.

Because of the various objections cited, therefore, most planing machines built to-date to operate according to the continuous indexing process have had but a single tool.

The primary purpose of this invention is to provide a simple, compact, and practical two tool drive for gear planing machines of the continuous indexing type which will permit of the reciprocation of the tool slides simultaneously in opposite directions from a single crank but in such manner that, although the tools cut alternately the longitudinal tooth curves cut by each may be identical. With the present invention, therefore, there is provided a simple, inexpensive means for reciprocating a pair of tool slides alternately in opposite directions in such manner that the tools can cut alternately a curve of the same form on opposite side faces of a continuously rotating gear blank and in which the tool slides will be slowed down at either end of their stroke before reversal and started up with gradually increasing speed in the opposite direction after reversal.

Other objects of the invention will be apparent hereinafter from the specification and from the recital of the appended claims.

In the drawings:

Figure 3 is a front elevation of the cradle and tool slide; and

Figures 4 and 5 are details of the tool drive.

Figure 1:
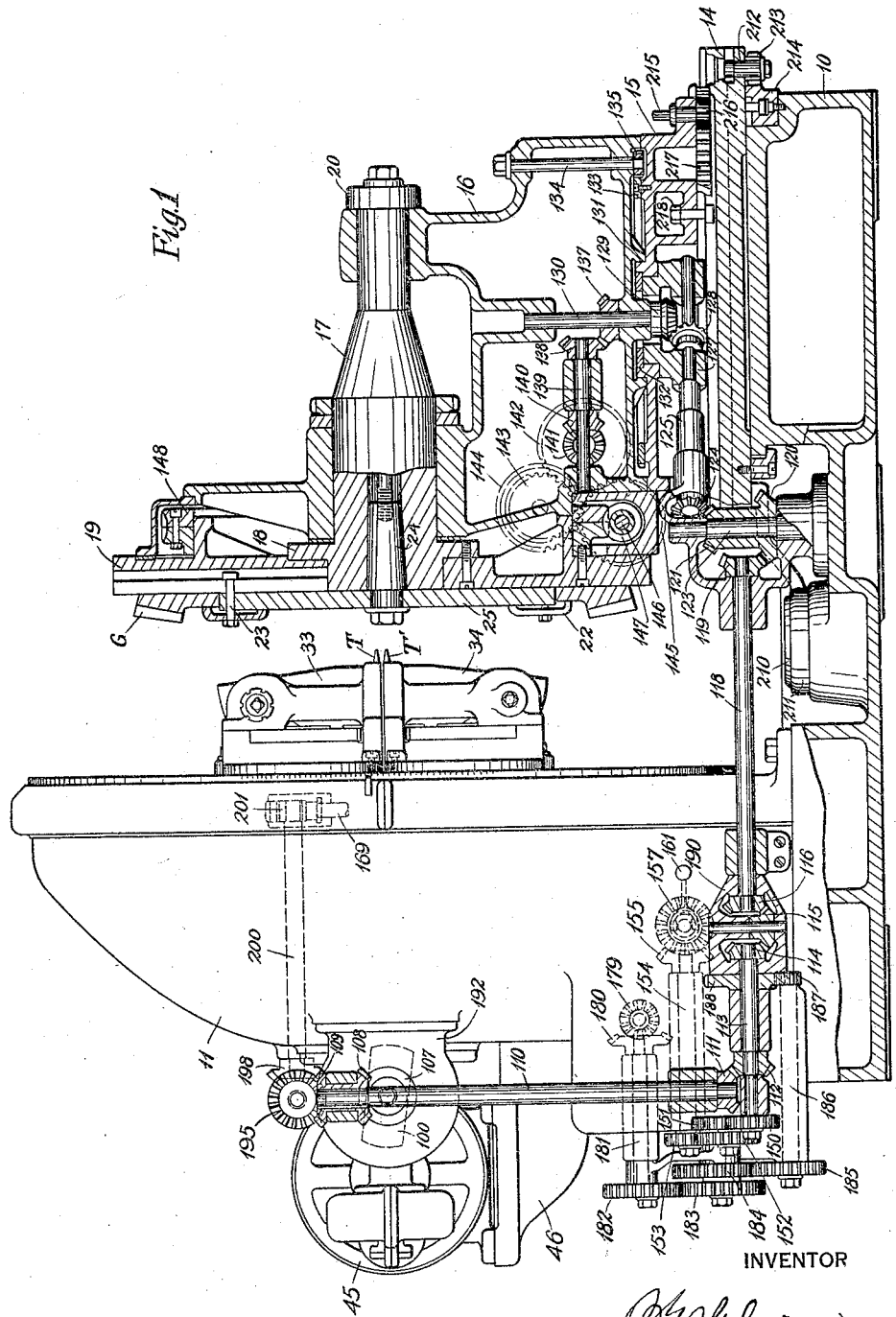
Figure 1 is a side elevation, partly in section, of a machine constructed according to a preferred embodiment of this invention.

In machines built according to this invention, a mechanism is employed which will produce a true harmonic motion and this mechanism is connected through suitable means to the two tool slides so as to reciprocate the same simultaneously in opposite directions. By actuating the tool slides with a true harmonic motion, the slides will move in opposite directions at the same variable velocity and hence the tools can be actuated simultaneously from the same source to cut alternately a longitudinal curve of the same form on opposite side faces of the blank. Moreover, the varying velocity of each tool slide under actuation of the true harmonic motion driving means will enable the attainment of the correct cutting speed while producing the slow stop and start motion at either end of the stroke required to reverse the slide without shock.

The present invention is of especial value in machines operating according to the principles of Patent No. 1,616,439 of February 8, 1927, and it is in connection with a machine of this type that the present invention is disclosed. In machines constructed according to said patent, the tooth curve produced is a resultant of the variable motion of the tool, the uniform rotation of the blank and of an added variable motion imparted between tool and blank in timed relation with the tool motion. In a machine operating according to the present invention, the motions of the tools when cutting alternately are the same because they are actuated from a single harmonic motion driving means. Hence, the motion of the tools can be combined with the uniform rotation of the blank and an added variable motion to effect during the stroke of one tool a cut of a certain lengthwise curvature on one tooth side of the blank and to effect during the cutting stroke of the other tool a cut of identical curvature on an opposite tooth surface of the blank.

The present invention is illustrated in connection with a machine for generating bevel gears. In the machine illustrated, the two tools are reciprocated simultaneously in opposite directions with a true harmonic motion to cut alternately upon the blank, the blank is rotated continuously on its axis at a uniform velocity, the tools are mounted upon a cradle or carrier and this cradle or carrier is given a combined uniform rotational movement on its axis and an oscillating movement at a variable velocity also about its axis. The latter movement, which is of a harmonic nature, combines with the cutting movement of the tools and the uniform rotational movement of the blank to produce the longitudinal tooth curvature of the teeth cut on the blank. The uniform rotational movement of the cradle on its axis in combination with the rotation of the blank serves to generate the tooth profiles. In this machine, each tool cuts during its stroke in one direction and is clapped out of cutting position on its return stroke. The two tools cut alternately during movement in the same direction and due to the continuous rotation of the blank which serves to continuously index the blank, each tool operates upon a different tooth surface of the blank on each successive cutting stroke. The teeth of the blank are thus all finished simultaneously.

Referring now to the drawings by numerals of reference, 10 designates the base or frame of the machine. Secured to or formed integral with this base or frame is the upright or housing 11 on which the cradle or carrier 12 is mounted. Mounted upon the base or frame 10, also, is the swinging table or carriage 14 upon which the work head carrier 15 is adjustably mounted. Mounted for swiveling or end for end adjustment on this work head carrier 15 is the work head 16 in which the work spindle 17 is journaled. The work spindle 17 is provided with an enlarged head 18 at one end to which is secured a face plate 19. This spindle 17 is provided at its other end with a smaller head 20. When a gear blank is to be cut it may be secured to the face plate 19. When a pinion blank is to be cut it may be secured to the head 20 and the spindle 17 swiveled or adjusted end for end to bring the pinion blank into the proper cutting position. In the drawings, a gear blank G is shown secured to the face plate 19 by means of the clamping plates 22 and the T-bolts 23, the heads of which engage in radial T-slots formed in the face of the plate 19. A draw-bolt 24 serves to secure the spacing plate 25 and the gear blank G to the work spindle 17. The swivelling adjustment of the work head will be described more particularly hereinafter.

Pivotally mounted upon the cradle for angular adjustment thereon about a common axis offset from the axis of the cradle are a pair of arms 29 and 30. These arms 29 and 30 are provided with guide ways in which the tool slides 31 and 32 move. Gibs are provided for each slide to take up wear. Adjustably mounted upon the slides are the clapper block carriers 33 and 34, respectively. These clapper block carriers are adjustable to permit cutting of gears of different face widths and may be secured in any adjusted position upon their respective slides by means of T-bolts 36 which engage in T-slots 37 formed in the slides. The clapper block carriers 33 and 34 carry clapper blocks 39 and 40, respectively. Angularly adjustable upon the clapper blocks are the tool blocks 41 and 42, respectively. Secured to these tool blocks are the tools T and T' which are adapted to cut upon opposite side faces of the teeth of the blank.

The clapper blocks 39 and 40 are adapted to be moved intermittently to move the tools to and from cutting position. They may be of any usual or suitable structure. The structure shown is that described more particularly in the copending application of M. H. Hill, Serial No. 243,615 filed December 30, 1927. The tools T and T' may be set by the angular adjustment of the tool blocks 41 and 42 to provide the necessary clearance for the tools during the cut.

The mechanism for imparting to the tool slides their true harmonic motion, which will give the slides the same variable motion on their alternate cutting strokes will now be described. The machine is actuated from a motor 45 which is mounted upon a bracket 46 secured to or formed integral with the upright 11. The motor drives the shaft 47 through a pair of gears 48 and 49. Secured to the shaft 47 is a bevel pinion 50 which meshes with and drives a bevel gear 51 which is keyed to the shaft 52. This shaft 52 is journaled in suitable bearings coaxially of the cradle 12. Fixed to the shaft 52 at its inner end is a spur pinion 53 (Figs. 2 and 4) which meshes with and drives a spur gear 55. The spur gear 55 is secured to or formed integral with a crank disc which is rotatably mounted upon a stud 57 that is secured to the frame work of the cradle.

Swivelly mounted upon the crank pin 58 is a block 59 which is adapted to travel in the rectangular slot 60 formed in the head 61 of a sliding member 62. This sliding member 62 reciprocates in guide-ways 63 formed on the cradle and is held in position by the guide plates 64 (Figures 4 and 5).

Due to the block and slot connection between the sliding member 62 and the crank pin 58, the sliding member is reciprocated with a true harmonic motion, for as the crank revolves the distance which the crank pin 58 moves, measured in a horizontal direction, will be the same as the movement of the slide member 62. Through this mechanism, the slide member will move with the same variable velocity on its forward as on its return stroke and the phases of its movement will be the same at diametrically opposed positions of the crank pin.

From this mechanism, a true harmonic motion is imparted to the tool slides by any appropriate connecting mechanism, such as herein disclosed. The connecting mechanism includes a rack 65 which is secured to the slide 62. This rack meshes with and oscillates the pinion 67 which is secured to a shaft 68 mounted for rotation on the same axis as that about which the arms 29 and 30 are adjustable. Secured to the shaft 68 at its outer end is a pinion 70. This pinion 70 meshes with a pair of opposed racks 71 and 72 secured, respectively, to the tool slides 31 and 32. Through the mechanism described, the tool slides are reciprocated simultaneously in opposite directions with a true harmonic motion. The length of the tool strokes can be changed by changing the pinion 70 or the pinion and the racks 71 and 72. If desired, an adjustment might be provided, also, for adjusting the eccentricity of the crank pin 58 with reference to the axis of the crank.

Figure 2:
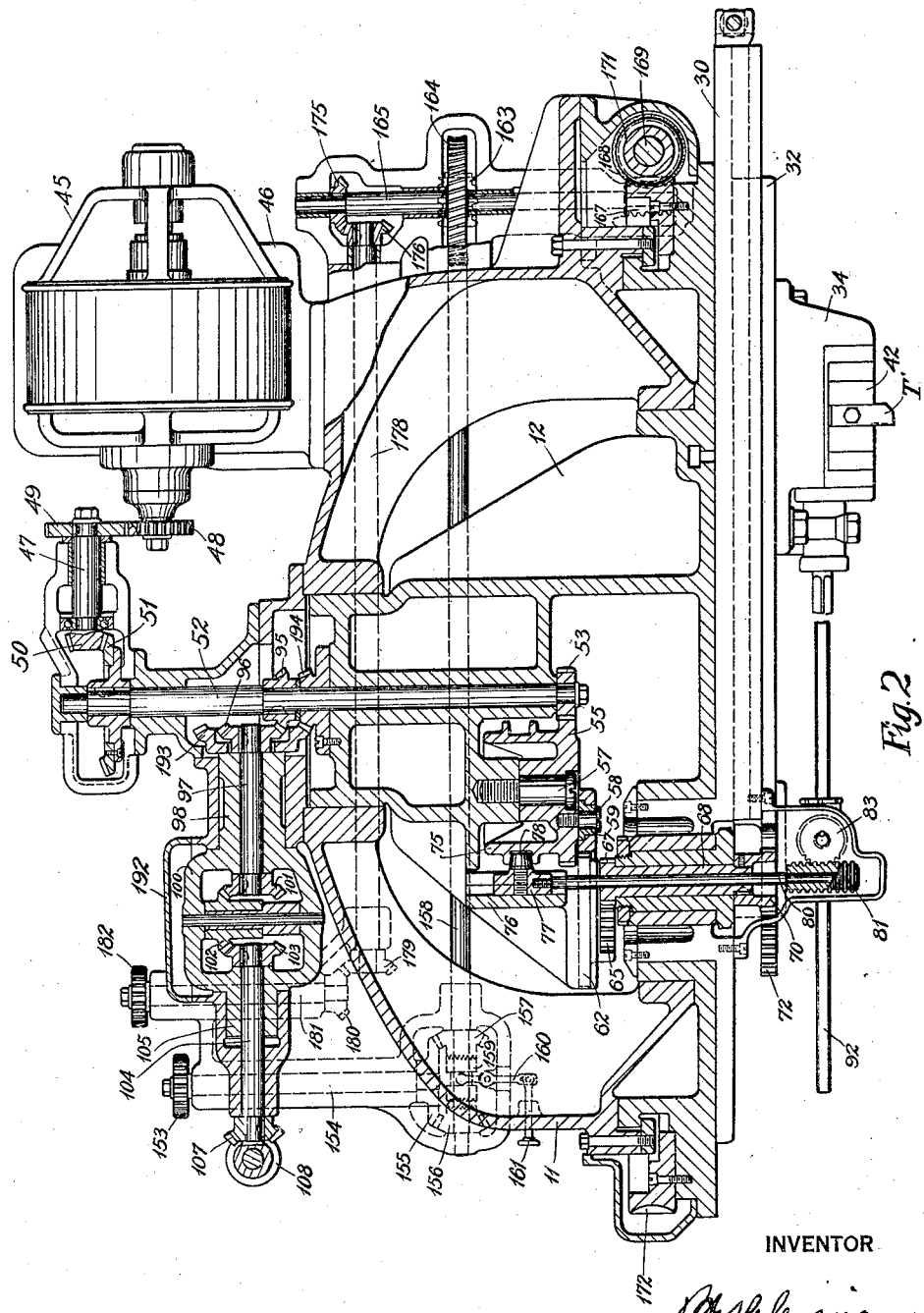
Figure 2 is a sectional plan view of the tool mechanism and cradle.

Secured to the crank plate 55, or formed integral therewith is a cam 75 (Fig. 2). This cam serves to actuate the clapping mechanism for the tools. This clapping mechanism may be of any usual or suitable character. The mechanism illustrated is more particularly described in the copending application Serial No. 243,615 above referred to.

The cradle is provided with a guide way 76 for a slidable block 77. Secured to this block 77 is a roller 78 which engages with the peripheral groove of the cam 75. Secured to the block 77 is a rod 80 which reciprocates in a bore formed in the shaft 68. This rod 80 has secured to it at its outer end a cylindrical rack member 81 which might, also, be termed a worm without a lead. This rack member 81 meshes with a pair of worm wheels 82 and 83 (Figs. 2 and 3). One worm wheel is secured to a shaft 85 which is journaled in a bracket secured to the tool slide, and the other worm wheel 83 is secured to a shaft 86 which is journaled in a corresponding bracket secured to the other tool slide 32. The shaft 85 has secured to its upper end a bevel gear 87 which meshes with a bevel gear 88 on a splined shaft 89, while the shaft 86 has secured to its lower end a bevel gear 90 which meshes with a bevel gear 91 on a splined shaft 92. The gears 88 and 91 are in opposed relation, respectively, with their respective meshing gears 87 and 90, so that when the worm wheels 82 and 83 are actuated intermittently from the cam 75 and rod 80, the splined shafts 89 and 92 will be rotated simultaneously in opposite directions. In this way, through suitable connections between the splined shafts 89 and 92 the clapper blocks 39 and 40 will be simultaneously moved in opposite directions to move one tool into cutting position while the other is being within drawn therefrom. Through this arrangement, the tools will cut alternately and while moving in the same direction.

During the operation of the machine, the blank is rotated continuously and at a uniform velocity on its axis. The mechanism for imparting to the blank this continuous uniform indexing motion will now be described.

Secured to the shaft 52 (Fig. 2) intermediate its length is a bevel pinion 95 which meshes with and drives a bevel pinion 96 which is secured to a shaft 97 that is journaled in the sleeve 98 of a differential housing 100. Fixed to the shaft 97 at its inner end is a bevel gear 101 forming one of a set of differential gears 101, 102, and 103 which connect the shaft 97 with the aligned shaft 104. This shaft 104 is journaled in the sleeve 105 of the differential housing 100.

Keyed to the shaft 104 at its outer end is a miter gear 107 (Figs. 1 and 2) which meshes with and drives a miter gear 108 which is formed integral with a miter gear 109 and which has a splined connection with the vertical shaft 110.

Secured to the vertical shaft 110 at its lower end is a bevel gear 111 which meshes with and drives a bevel gear 112 on a horizontal shaft 113. This shaft 113 is journaled in a suitable bracket secured to the upright 11. The shaft 113 carries at its inner end a bevel gear 114 forming one of a set of differential gears 114, 115 and 116 which serve to connect the shaft 113 with the aligned shaft 118. The shaft 118 carries at its further end a bevel pinion 119 which meshes with and drives a bevel gear 120 which is formed integral with a miter gear 121. The two gears 120 and 121 are rotatable upon a stud 123. The miter gear 121 meshes with a miter gear 124 which is secured to a telescoping shaft 125. This shaft 125 is journaled at its inner end in a bracket 127 which has a bearing in a cylindrical opening formed in the work head carrier 15.

Secured to the telescoping shaft 125 intermediate its length is a miter gear 128 which meshes with and drives a miter gear 129 that is keyed to a vertical shaft 130 which is journaled in the work head 16. The work head 16 is provided with an annular guide surface 131 which seats upon a corresponding bearing 132 formed on the work head carrier 15. Secured to the work head carrier 15 coaxially of this bearing is a ring gear 133. Journaled in the work head 16 is a vertical shaft 134 to the lower end of which is secured a spur pinion 135 which meshes with the ring gear 133. By rotating this shaft 134 manually, as by means of a wrench, the work head 16 can be swivelled end for end about the center of the bearing 132 which coincides with the axis of the vertical shaft 130. Secured to the shaft 130 intermediate its length is a miter gear 137 which meshes with and drives a miter gear 138 which is keyed to a horizontal shaft 139. The horizontal shaft 139 is journaled in the work head 16 and carries intermediate its length a miter gear 140 which meshes with a miter gear 141 upon a transverse shaft. The transverse shaft carries at its outer end a spur gear 142 and drives through spur gears 143, 144, and 145 the worm shaft 146. Secured to this worm shaft 146 is the index worm 147 which meshes with and rotates the index worm wheel 148 which is secured to the face plate 19 and through this face plate to the work spindle 17. Through the mechanism described, the blank is rotated continuously on its axis and at a uniform velocity. By arranging the vertical shaft 130 coaxially of the swivelling axis about which the work head 16 is rotated, the drive to the blank can be maintained with accuracy in any position of the work head.

For the purpose of generating the tooth profiles, a continuous rotary motion is imparted to the cradle from the shaft 113 (Fig. 1). This shaft 113 carries at its outer end a spur gear 150 which drives through the spur gears 151, 152, and 153 (Figs. 1 and 2) the shaft 154. The gears 150, 151, 152, and 153, constitute a set of feed change gears. Shaft 154 carries at its inner end a bevel gear 155 which is in continuous meshing engagement with a pair of opposed bevel gears 156 and 157. The bevel gears 156 and 157 are rotatable upon the transverse shaft 158 and may be connected in driving engagement with said shaft by means of a shiftable clutch 159 which has a splined connection with the shaft and which is shiftable to engage either of the gears 156 or 157, by means of a yoke member 160 that is controlled by the handle 161, (Fig. 2).

The shaft 158 is journaled in the upright 11 and extends across the machine. It has secured to it at its further end a worm 163 which meshes with and drives a worm wheel 164 that is keyed to a shaft 165. Keyed to the shaft 165 at its forward end is a worm 167 (Figs. 2 and 3). This worm 167 meshes with and drives a worm wheel 168 which has a splined connection with a vertical shaft 169. Keyed to the shaft 169 is a worm 171 which meshes with and drives the worm wheel 172 which is secured to the cradle 12.

Through the mechanism just described a continuous rotary movement at a uniform velocity is imparted to the cradle. This motion acts in conjunction with the rotation of the blank to produce a relative rolling motion between the tools and blank corresponding to that of a gear rolling upon a basic gear, as a crown gear, the axis of which is represented by the axis of the cradle.

To cut gears accurately on a machine of the type described, it is necessary to maintain at all times a correct timed relation between the tool and blank movements. Some means must be provided, therefore, to compensate for the cradle movement which would otherwise disturb this timed relation. A compensating differential is therefore preferably employed.

For the purpose of maintaining this timed relation, there is secured to the shaft 165 (Fig. 2) a miter gear 175. This miter gear meshes with and drives a miter gear 176 which is secured to a shaft 178. Keyed to the shaft 178 is a miter gear 179 which meshes with and drives a miter gear 180 upon a shaft 181.

Secured to the shaft 181 at its outer end is a spur gear 182 which drives through the spur gears 183 (Fig. 1) 184, and 185 the shaft 186. The shaft 186 carries fixed to it at its inner end a spur pinion 187 which meshes with and drives a spur gear 188 that is secured to the housing 190 of the differential gears 114, 115 and 116.

Through the means just described, an additional motion is imparted to the shaft 118 and thence to the blank spindle to compensate for the movement of the cradle thus maintaining at all times a correct timed relation between the tool and blank movements.

The machine illustrated is constructed to produce spiral or helical bevel gears. In a pair of such gears, the teeth of the two members are of opposite hand. It is generally preferable to have the crank 55 rotate in one direction. Hence, in cutting one member of the pair the blank spindle 17 must rotate in one direction and in cutting the other member of the pair the blank spindle will rotate in the opposite direction. Now the rotation of the blank in opposite directions changes the relation between the blank and the main drive shaft for which the ratio change gears 182, 183, 184 and 185 and the differential 190 compensate. With the machine illustrated the same ratio change gears can be employed, however, in cutting both members of the pair. This is achieved by employing an additional differential and driving all of the elements of the blank and cradle drives, including the compensating differential, through this additional differential.

This additional differential comprises the differential housing 100 which is journaled in a suitable bracket 192 secured to the upright 11 and the gears 101, 102 and 103 (Fig. 2) mounted within this differential housing 100. The differential housing 100 is rotated from the cradle by means of the bevel gear 193 which is secured to the sleeve 98 of the housing and the bevel pinion 194 which meshes with said gear 193 and is secured to the cradle 12. Thus, as the cradle moves in either direction, the differential comprising the housing 100 and the gears 101, 102 and 103 speeds up or retard the shaft 104 and through this shaft the blank spindle 17 and cradle drive shaft 169, thus compensating for the cradle movement. The arrangement described obviates much calculation.

As has already been stated, the present invention is of particular value in machines operating upon the principles of patent No. 1,616,439 above referred to. The motion of a reciprocating planing tool in its cut while moving across the face of a continuously rotating blank will produce an S-curve upon the blank. According to the patent mentioned, an additional variable motion may be produced between tool and blank to combine with the variable cutting motion of the tool and the uniform rotation of the blank to produce a curve on the blank which extends substantially in one direction throughout its length. With the present invention, since the motion of the tool slides are the same for diametrically opposed positions of the crank 55, the added variable motion can be combined at all times with the tool motion, so that two tools may be employed as described and operate upon the blank alternately.

The means for imparting the added variable motion between tool and blank which is continuous during the operation of the machine will now be described.

The miter gear 109 (Figs. 1 and 3), already referred to, meshes with and drives a miter gear 195 which is keyed to a transverse shaft 196. This shaft 196 has secured to it a miter gear which meshes with a miter gear 198 (Fig. 1) on a shaft 200. The shaft 200 carries at its inner end an eccentric 201 (Figs. 1 and 3). Mounted on the eccentric is a block 202 which travels in a rectangular slot 203 provided therefor in the head 204 of the shaft 169. Through the mechanism just described, the shaft 169 is given a reciprocating motion at a variable velocity of a harmonic nature, oscillating the cradle on its axis. This motion is combined with a slow rotary generating motion of the cradle through the splined connection of the shaft 169 with the rotating worm wheel 168. This motion acts on the up-stroke of the shaft 169 to combine with the rotation of the blank and the cutting stroke of one tool to take a spiral or helically curved cut on the blank. It acts during the down stroke of the shaft 169 to combine with the continuous rotation of the blank and the cutting stroke of the other tool to produce a spiral or helically curved cut on the opposite side tooth surface of the blank. Through the combination of these motions, the tools can be used to cut alternately upon opposite side tooth surfaces of the blank and take spiral or helical cuts curved substantially in the same direction throughout their length on these tooth surfaces. Preferably, the gearing in the machine is so chosen that the eccentric rotates at twice the speed of the crank disc 55 so that the variable motion produced by the eccentric is of twice the frequency of the variable motion produced by the crank, as this has been found to give a very desirable form of longitudinal tooth curve.

The machine is provided with the usual adjustments required for positioning the tool and blank in proper cutting relation. Thus, the blank can be angularly adjusted into the proper cutting plane by swinging the table or carriage 14 about the axis of a bearing 210 (Fig. 1), an extension 211 of this table 14 being journaled on said bearing. This angular adjustment can be effected by rotating the shaft 212 (Fig. 1) which carries a spur pinion 213 that meshes with a spur gear segment 214 which is secured to the base 10. The blank can be adjusted axially for different cone distances by means of the shaft 215 and the spur pinion 216 secured thereto, the latter meshing with a rack 217 which is secured to the table 14. The blank can be secured in any adjusted position by means of bolts 218, the heads of which take into T-slots formed in the table 14. The end for end adjustment of the blank head has already been described.

The angular adjustment of the arms 29 and 30 (Fig. 3) about the axis of the shaft 68 which is offset from the axis of the cradle permits of opening or closing these arms to cut teeth of different widths and of moving the tools in converging paths. The arms can be adjusted relatively to each other by means of the double-ended screw 220 which threads into swivel nuts which are secured to the arms. The arms can also be swung bodily about the axis of this shaft 68 to offset the tool paths more or less from the axis of the cradle to thereby vary the spiral angle of the gears to be cut. After this latter adjustment, the arms can be secured in any adjusted position by means of the T-bolts 222 which engage in the circular T-slots 223 formed on the face of the cradle.

While the present invention has been described particularly with reference to a machine for generating bevel gears, it is to be understood that this invention is applicable also to machines for producing other types of gears as spur, helical, herringbone and hypoid, whether generated or non-generated. In the cutting of spur, helical and herringbone gears, the tools will be reciprocated in a plane parallel to the blank axis. In the cutting of hypoid gears, the blank axis will be preferably offset from the axis of the cradle.

In general, it may be said, that the present invention is capable of various further modifications and uses and that this application is intended to cover any adaptations, variations, or uses of this invention, following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. In a machine for producing gears, means for imparting a continuous indexing rotation to the blank, a pair of guides arranged alongside one another, a pair of tool slides reciprocable in said guides and carrying tools adapted to operate, respectively, on opposite sides of the teeth of the blank, and a single means actuating both slides for reciprocating said slides with a true harmonic motion simultaneously in opposite directions.

2. In a machine for producing gears, means for imparting a continuous indexing rotation to the blank, a pair of guides arranged alongside one another, a pair of tool slides reciprocable in said guides and carrying tools adapted to operate, respectively, on opposite sides of the teeth of the blank, and means for reciprocating said slides simultaneously in opposite directions including a reciprocable member provided with a transverse slot, a crank, a block swivelly connected to said crank and adapted to travel in the slot of said reciprocable member and means operatively connecting said reciprocable member with each of said slides.

3. In a machine for producing gears, means for imparting a continuous indexing rotation to the blank, a pair of reciprocating tool slides carrying tools adapted to operate on opposite sides of the teeth of the blank, and means for reciprocating said slides simultaneously in opposite directions including a reciprocable member provided with a transverse slot, a crank, a block pivotally connected to said crank and adapted to travel in the slot of said reciprocable member and connections between said reciprocable member and the tool slides comprising a rack on the reciprocable member, a pinion meshing therewith and a pinion driven by the first pinion and meshing with a pair of opposed racks, one of which is secured to each of said slides.

4. In a machine for producing gears, means for imparting a continuous indexing rotation to the blank, a pair of guides arranged alongside one another, a pair of tool slides reciprocable in said guides and carrying tools adapted to operate, respectively, on opposite sides of the teeth of the blank, a single means for actuating both slides to reciprocate said slides with true harmonic motions simultaneously in opposite directions, clapping mechanism for each tool adapted to move the tool to and from cutting position and means for operating said clapping mechanism in such timed relation to the reciprocating mechanism for the tool slides that when one tool is in cutting position the other is out of cutting position, whereby the tools cut alternately on movement in the same direction.

5. In a machine for producing gears, means for imparting a continuous indexing rotation to the blank, a pair of guides arranged alongside one another, a pair of tool slides reciprocable in said guides and carrying tools adapted to operate, respectively, on opposite sides of the teeth of the blank, and means for reciprocating said slides simultaneously in oposite directions including a reciprocable member provided with a transverse slot, a crank, a block swively connected to said crank and adapted to travel in the slot of said reciprocable member and means operatively connecting said reciprocable member with each of said slides, clapping mechanisms for each tool adapted to move the tools to and from cutting position and means for operating said clapping mechanism in such timed relation to the reciprocating mechanism for the tool slides that when one tool is in cutting position the other tool is out of cutting position, whereby the tools cut alternately on movement in the same direction.

6. In a machine for producing tapered gears, means for imparting a continuous indexing rotation to the blank, a pair of guides which are angularly adjustable about a common center, a pair of tool slides reciprocable in said guides and carrying tools adapted to operate, respectively, on opposite sides of the teeth of the blank, and means for simultaneously reciprocating said tool slides in opposite directions with a true harmonic motion.

7. In a machine for producing tapered gears, means for imparting a continuous indexing rotation to the blank, a pair of guides which are angularly adjustable about a common center offset from the apex of the blank, a pair of tool slides reciprocable in said guides and carrying tools adapted to operate, respectively, on opposite sides of the teeth of the blank, means for simultaneously reciprocating said tool slides in opposite directions with a true harmonic motion, and means for simultaneously producing an added variable motion of a harmonic nature between the tools and blank, said last named motion combining with the tool motion and the uniform rotation of the blank to produce the longitudinal tooth curves.

8. In a machine for producing gears, means for imparting a continuous indexing rotation to the blank, a pair of reciprocating tool slides carrying tools adapted to operate on opposite sides of the teeth of the blank, means for reciprocating said slides simultaneously in opposite directions including a reciprocable member provided with a transverse slot, a crank, a block swively connected to said crank and adapted to travel in the slot of said reciprocable member, a rack on the reciprocable member, a pinion meshing therewith and a pinion driven by the first pinion and meshing with a pair of opposed racks, one of which is connected to each of said tool slides, clapping mechanism for each tool adapted to move the tool to and from cutting position and means for operating said clapping mechanism in such timed relation to the reciprocating mechanism for the tool slides that when one tool is in cutting position the other is clapped therefrom, whereby the tools cut alternately on movement in the same direction.

9. In a machine for producing gears, a blank support adapted to carry a tapered gear blank, a pair of reciprocating tool slides carrying tools adapted to operate on opposite sides of the teeth of the blank, means for adjusting the blank support to position the blank in proper cutting position, a pair of arms, on which the tool slides are mounted, pivotable about an axis offset from the cone apex of the blank to permit adjusting the tools for movement in converging paths, means for imparting a continuous indexing rotation to the blank and means for reciprocating said slides simultaneously in opposite directions including a reciprocable member provided with a transverse slot, a crank, a block pivotally connected to said crank and adapted to travel in the slot of said reciprocable member, and means operatively connecting said reciprocable member with each of said slides.

10. In a machine for producing gears, a blank support, adapted to carry a tapered gear blank, a pair of reciprocatory tool slides carrying tools adapted to operate on opposite sides of the teeth of the blank, means for adjusting the blank support to position the blank in proper cutting position, a pair of arms on which the tool slides are mounted pivotable about an axis offset from the cone apex of the blank to permit adjusting the tools for movement in converging paths, means for imparting a continuous indexing rotation to the blank support, and means for reciprocating said slides simultaneously in opposite directions including a reciprocable member provided with a transverse slot, a crank, a block swively connected to said crank and adapted to travel in the slot of said reciprocable member, a rack on the reciprocable member, a pinion meshing therewith, and a pinion driven by the first named pinion and meshing with a pair of opposed racks one of which is secured to each of said tool slides.

11. In a machine for producing gears, means for imparting a continuous indexing rotation to the blank, a pair of reciprocating tool slides carrying tools adapted to operate on opposite sides of the teeth of the blank, means for reciprocating said slides with a true harmonic motion simultaneously in opposite directions and means for simultaneously producing an added variable motion of a harmonic nature between the tools and blank, said last named motion combining with the tool motions and the uniform rotation of the blank to produce the longitudinal tooth curves.

12. In a machine for producing gears, means for imparting a continuous indexing rotation to the blank, a pair of reciprocating tool slides carrying tools adapted to operate on opposite sides of the teeth of the blank, means for reciprocating said slides simultaneously in opposite directions including a reciprocable member provided with a transverse slot, a crank, a block swivelly connected to said crank and adapted to travel in the slot of said reciprocable member and means operatively connecting said reciprocable member with each of said slides, and means for simultaneously producing an added variable motion of a harmonic nature between the tools and blank, said last named motion combining with the tool motions and the uniform rotation of the blank to produce the longitudinal tooth curves.

13. In a machine for producing gears, means for imparting a continuous indexing rotation to the blank, a pair of reciprocating tool slides carrying tools adapted to operate on opposite sides of the teeth of the blank, means for reciprocating said slides simultaneously in opposite directions including a reciprocable member provided with a transverse slot, a crank, a block swivelly connected to said crank and adapted to travel in the slot of said reciprocable member, a rack on the reciprocable member, a pinion meshing therewith and a pinion driven by the first pinion and meshing with a pair of opposed racks, one of which is secured to each of said tool slides, and means for simultaneously producing an added variable motion of a harmonic nature between the tool and blank at a multiple of the frequency of the harmonic motion of the tools, said last named motion combining with the tool motion and the uniform rotation of the blank to produce the longitudinal tooth curves.

14. In a machine for producing gears, a blank support, a pair of reciprocating tool slides carrying tools adapted to operate on opposite sides of the teeth of the blank, a rotatable cradle, means for adjusting the blank support to position the blank in proper cutting position, a pair of arms on which the tool slides are mounted pivotable about an axis offset from the axis of the cradle to permit positioning the tools for movement in converging paths offset from the axis of the cradle, means for imparting a continuous indexing rotation to the blank, means for rotating the cradle continuously on its axis, a single means operative with a true harmonic motion for actuating said slides to reciprocate said slides simultaneously in opposite directions, and means for simultaneously producing an added variable movement of a harmonic nature between the tools and blank, said last named motion combining with the motions of tools, blank support, and cradle to produce the longitudinal tooth curves.

15. In a machine for producing gears, a blank support, a pair of reciprocating tool slides carrying tools adapted to operate on opposite sides of the teeth of the blank, a rotatable cradle, means for adjusting the blank support to position the blank in proper cutting position, a pair of arms on which the tool slides are mounted, pivotable about an axis offset from the axis of the cradle, to permit positioning the tools for movement in converging paths offset from the axis of the cradle, means for imparting a continuous indexing rotation to the blank, means for reciprocating said slides simultaneously in opposite directions including a reciprocable member provided with a transverse slot, a crank, a block pivotally connected to said crank and adapted to travel in the slot of said reciprocable member and means operatively connecting said reciprocable member with each of said slides, and means for simultaneously producing an added variable motion of a harmonic nature between the tools and blank, said last named motion combining with the tool, blank, and cradle motions to produce the longitudinal tooth curves.

16. In a machine for producing gears, a blank support, a pair of reciprocating tool slides carrying tools adapted to operate on opposite sides of the teeth of the blank, a rotatable cradle, means for adjusting the blank support to position the blank in proper cutting position, a pair of arms on which the tool slides are mounted pivotable about an axis offset from the axis of the cradle to permit positioning the tools for movement in converging paths offset from the axis of the cradle, means for imparting a continuous indexing rotation to the blank, means for reciprocating said slides simultaneously in opposite directions including a reciprocable member provided with a transverse slot, a crank, a block swivelly connected to said crank and adapted to travel in the slot of said reciprocable member, a rack on the reciprocable member, a pinion meshing therewith, and a pinion driven by the first pinion and meshing with a pair of opposed racks, one of which is secured to each of said slides, means for imparting a continuous rotation at a uniform velocity to the cradle, and means for simultaneously imparting a variable motion of a harmonic nature to said cradle, said last named motion combining with the uniform rotational movement of the cradle, the blank rotation and the movement of the tools to produce the longitudinal tooth curves.

17. In a machine for producing gears, a blank support, a pair of reciprocating tool slides carrying tools adapted to operate on opposite sides of the teeth of the blank, means for adjusting the blank support to position the blank in proper cutting position, a cradle, a pair of arms on which the tool slides are mounted, pivotable about an axis offset from the axis of the cradle to permit positioning the tools for movement in converging paths offset from the axis of the cradle, means for imparting a continuous indexing rotation to the blank, means for rotating the cradle continuously on its axis, means for reciprocating said tool slides with a true harmonic motion simultaneously in opposite directions, means for simultaneously producing an added variable motion of a harmonic nature between the tools and blank, said last named motion combining with the tool motions and uniform rotation of the blank to produce the longitudinal tooth curves, clapping mechanism for each tool adapted to move the tool to and from cutting position, and means for operating said clapping mechanism in such timed relation to the reciprocating mechanism for the tool slide that when one tool is in cutting position, the other is clapped therefrom, whereby the tools cut alternately on movement in the same direction.

18. In a machine for producing gears, a blank support, a pair of reciprocating tool slides carrying tools adapted to operate on opposite sides of the teeth of the blank, a rotatable cradle, means for adjusting the blank support to position the blank in proper cutting position, a pair of arms on which the tool slides are mounted, pivotable about an axis offset from the axis of the cradle to permit positioning the tools for movement in converging paths offset from the axis of the cradle, means for imparting a continuous indexing rotation to the blank, means for reciprocating the slides simultaneously in opposite directions including a reciprocable member provided with a transverse slot, a crank, a block swively connected to said crank and adapted to travel in the slot of said reciprocable member and means operatively connecting said reciprocable member with each of said slides, thereby to reciprocate said slides at a variable velocity with a true harmonic motion, means for rotating the cradle and means for simultaneously producing an added variable motion of a harmonic nature between the tools and blank, said last named motion combining with the tool, blank, and cradle motions to produce the longitudinal tooth curves, clapping mechanism for each tool adapted to move the tool to and from cutting position, and means for operating said clapping mechanism in such timed relation to the reciprocating mechanism for the tool slides that when one tool is in cutting position the other is clapped therefrom, whereby the tools cut alternately on movement in the same direction.

19. In a machine for producing gears, a blank support, a pair of reciprocating tool slides carrying tools adapted to operate upon opposite sides of the teeth of the blank, a rotatable cradle, means for adjusting the blank support to position the blank in proper cutting position, a pair of arms on which the tool slides are mounted, pivotable about an axis offset from the axis of the cradle to permit positioning the tools for movement in converging paths offset from the axis of the cradle, means for imparting a continuous indexing rotation to the blank, means for reciprocating said slides simultaneously in opposite directions including a reciprocable member provided with a transverse slot, a crank, a block swively connected to said crank and adapted to travel in the slot of said reciprocable member, a rack on the reciprocable member, a pinion meshing therewith, a pinion driven by the first pinion and meshing with a pair of opposed racks, one of which is secured to each of said tool slides, means for rotating the cradle on its axis continuously at a uniform velocity, means for simultaneously imparting to the cradle a rotational movement at a variable velocity, clapping mechanism for each of the tools adapted to move the tools to and from cutting position, and means for operating said clapping mechanism in such timed relation to the reciprocating mechanism for the tool slides that when one tool is in cutting position the other is clapped therefrom, whereby the tools cut alternately on movement in the same direction.

B. E. SHLESINGER.